March 1, 1966 G. P. DEYERLING 3,237,726
SHOCK ABSORBER LOCK
Filed Sept. 7, 1962
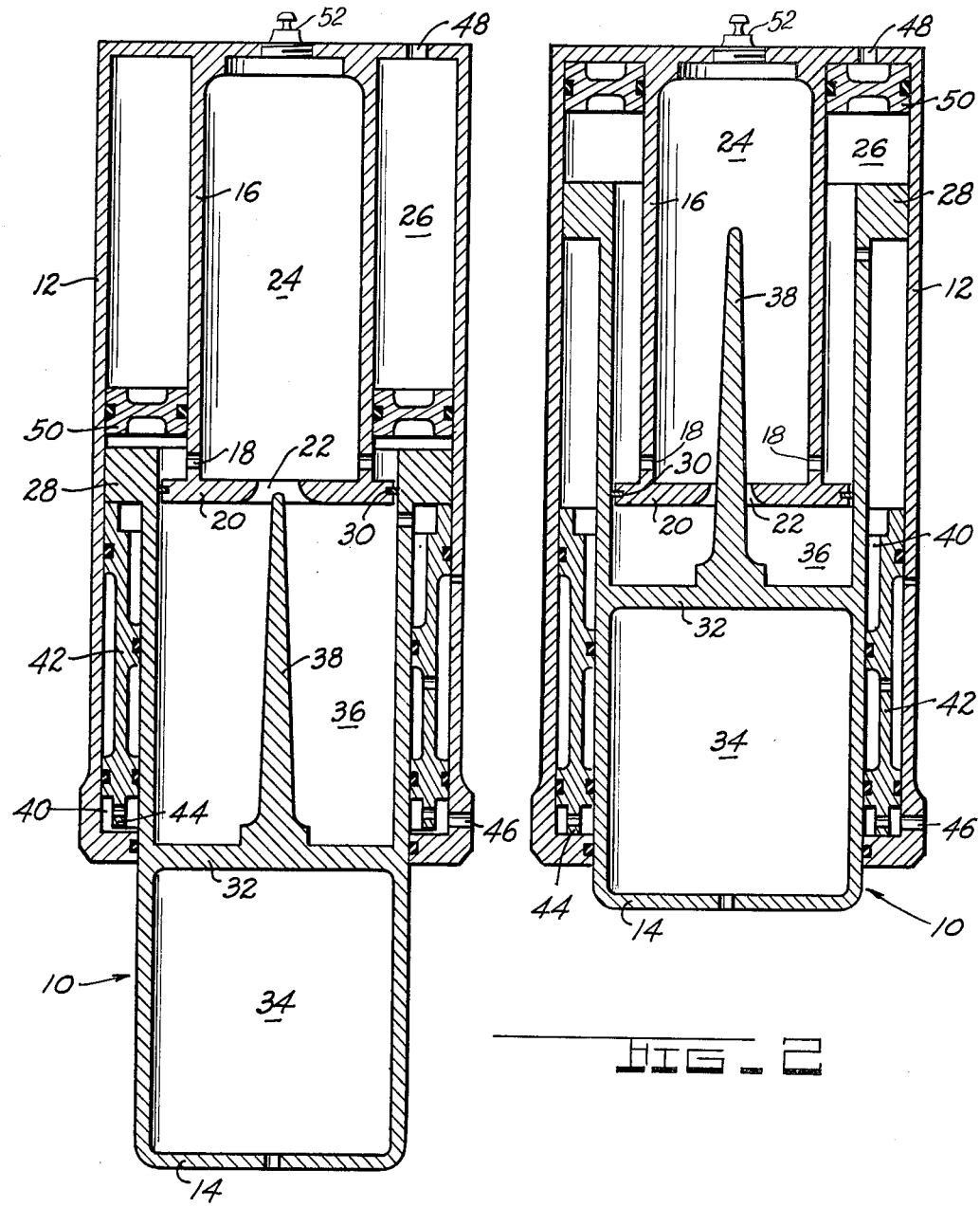
INVENTOR.
GERARD P. DEYERLING.
BY
*Richard G. Geib*
ATTORNEY.

United States Patent Office 3,237,726
Patented Mar. 1, 1966

3,237,726
SHOCK ABSORBER LOCK
Gerard P. Deyerling, South Bend, Ind., assignor to The Bendix Corporation, South Bend, Ind., a corporation of Delaware
Filed Sept. 7, 1962, Ser. No. 222,074
2 Claims. (Cl. 188—88)

This invention relates to the locking of an aircraft or similar type shock absorber which, during normal operation, is used to absorb energy. More particularly, this invention relates to means to lock the shock absorber in any position of its stroke.

With regard to shock absorbers for land vehicles and aircraft, they tend to raise or allow their associated craft to settle upon the discharging or loading of a cargo. In particular, as the gross weight is changed by virtue of fuel consumption or variation of the payload, the initial standing position of the shock absorber will also change. For instance, if the shock absorber is properly positioned with regard to the maximum gross weight of the craft and subsequently the craft is unloaded, the shock absorber will extend such that any ramp that may be used for unloading and/or loading of the aircraft may not be in the proper position or angular relationship with respect to the craft and the ground or loading dock. Therefore, the principal object of this invention is to prevent the shock absorber from extending or contracting.

It is another object to provide a means whereby a telescoping member can become a rigid fixed member which will remain at a fixed length regardless of the applied load.

The invention resides in certain constructions and combinations and arrangements of parts; and further objects and advantages of the invention will become apparent to those skilled in the art to which it relates from the following description of a preferred embodiment described with reference to the accompanying drawings forming a part of this specification and in which:

FIGURE 1 is a sectional side view of a shock absorber embodying the principles of my invention, which shock absorber is shown in an extended position; and FIGURE 2 is a somewhat similar sectional side view of the shock absorber embodying the features of my invention with the shock absorber contracted.

Referring to the drawings in which like symbols designate corresponding parts throughout, 10 designates generally a shock absorber assembly, which in the preferred form shown by the drawings, includes an upper cylinder 12 and a telescopically mounted lower cylinder 14.

As shown the upper cylinder is provided with a centrally disposed tubular member 16 having a plurality of drilled passages 18 in the sides thereof and terminating in an end wall 20. The end wall 20 is centrally bored, as at 22, to provide a metering orifice into a chamber 24 prescribed by the tube 16. Thus, it may be seen that the tube 16 also forms between its outer surface and the cylinder's inner surface an annular chamber 26.

The lower cylinder 14 is provided with walls that are adapted to seal with the end wall 20 by means of a piston ring 30. The lower cylinder is provided with a piston 28 which is provided with bearing surfaces to slide along the inner surface of cylinder 12. Within the lower telescoping cylinder 14 a wall 32 is provided, which wall divides the lower cylinder into an atmospheric chamber 34 and dynamic chamber 36. In addition, the wall 32 is arranged to mount a metering pin 38 such that the metering pin is aligned with the metering orifice 22.

The piston 28 is substantially larger in diameter than the lower telescoping tube 14 so that an annular space 40 exists between the outer wall of the lower telescoping cylinder and the inner wall of the upper cylinder. Within the space 40 I have floatingly provided a piston 42 which is provided with a downwardly depending stop projection 44 that allows the piston to rest on the bottom of the upper cylinder 12 so that the lower head of the piston will be raised from the bottom of the upper cylinder. As seen in the drawings, I have provided a port 46 adjacent the lower end of the upper cylinder 12 which communicates with the space 40, and to the upper end of the upper cylinder 12 I have provided a port 48 which communicates with the annular chamber 26. Within the annular chamber 26 I have also floatingly mounted a piston 50 which is slidingly mounted to reciprocate within the length of chamber 26.

When the shock absorber is free to function, the floating pistons 42 and 50 are adjacent the lower end of the cylinder 12 and the piston 28, respectively. Thus, upon the impact of forces to the lower telescoping cylinder 14, the cylinder 14 may telescope within the cylinder 12 to a position somewhat similar to that shown by FIGURE 2. In telescoping cylinder 14 within the cylinder 12 fluid is forced from the chamber 36 through the orifice 22 about the metering pin 38 into the chamber 24 which is partially filled with a compressible fluid, such as air, as by injecting same through a fitting 52, as may be readily appreciated by those skilled in the art to which my invention relates.

When it is desired to lock the position of the lower telescoping cylinder 14 with respect to the upper cylinder 12, fluid is introduced first through port 46, and after raising piston 42 to contact piston 28, port 46 is closed to provide a fluid block and fluid is then introduced to port 48 to move the floating piston 50 to approach the annular piston head 28 to thereby lock the lower telescoping cylinder 14 between the floating pistons 42 and 50, as may be seen in FIGURE 1. The force applied to piston 50 to lock the shock absorber is slightly greater than the maximum static air pressure. Thus, piston 50 will seek a point of equilibrium, and then port 48 is closed to provide a fluid block caused by increasing the fluid pressure on both sides of the piston 28 such that piston 28 is pressure suspended. As numerous fluid supply devices and valving means well known to the art may be provided for introducing fluid in ports 46 and 48, they are not deemed necessary of illustration in order to present the patentable features of my invention, as aforedescribed. It should be noted that it is quite conceivable that pistons 42 and 50 may be urged to contact piston 28 on both sides thereof to hold piston 28 from movement within cylinder 12.

While the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope and spirit of the invention as herein claimed.

I claim:
1. In a hydropneumatic shock absorber having a cylinder charged with air and hydraulic fluid, a central tubular depending structure dividing said cylinder into an inner and outer chamber and a piston arranged to reciprocate within said outer chamber, a means to hold said piston in any position along the length of said cylinder to form a rigid link, which means comprises:
   a first floating means mounted in said outer chamber above said piston;
   a second floating means mounted in said outer chamber below said piston; and
   passages in said cylinders above and below said first and said second floating means to port fluid behind both said floating means when it is desired to cause both said floating means to converge on said piston to hold said piston between both said floating means.

2. In a shock absorber having a cylinder charged with air and hydraulic fluid and a movable wall dividing said cylinder into variable volume chambers, a means to hold said movable wall, which means comprises:
- a first means to exert a pressure greater than the maximum static air pressure for said shock absorber below said movable wall under the command of an operator; and
- a second means to exert a pressure above said movable wall equal to that exerted by said first means whereupon said movable wall is rigidly positioned by a fluid pressure between said first and said second means.

References Cited by the Examiner
UNITED STATES PATENTS

| | | | |
|---|---|---|---|
| 2,127,755 | 8/1938 | Rosenberg | 188—88 X |
| 2,167,928 | 8/1939 | Johnson | 267—64 |
| 2,237,303 | 4/1941 | Calhoun | 255—16 |
| 2,596,471 | 5/1952 | Densmore et al. | 91—167 |
| 2,632,425 | 3/1953 | Grover | 92—28 |
| 2,761,473 | 9/1956 | Denton. | |
| 2,856,200 | 10/1958 | Conflitti. | |
| 2,922,397 | 1/1960 | Haanes | 91—167 X |
| 2,937,865 | 5/1960 | Patterson | 267—1 |
| 3,073,586 | 1/1963 | Hartel | 267—64 |

MILTON BUCHLER, *Primary Examiner.*

ARTHUR L. LA POINT, *Examiner.*